United States Patent
Turner

(10) Patent No.: US 9,559,568 B2
(45) Date of Patent: Jan. 31, 2017

(54) APPARATUS FOR ROAD VEHICLES

(71) Applicant: John H. Turner, Nottinghamshire (GB)

(72) Inventor: John H. Turner, Nottinghamshire (GB)

( * ) Notice: Subject to any disclaimer, the term of this patent is extended or adjusted under 35 U.S.C. 154(b) by 9 days.

(21) Appl. No.: 14/385,939

(22) PCT Filed: Mar. 13, 2013

(86) PCT No.: PCT/GB2013/000106
§ 371 (c)(1),
(2) Date: Sep. 17, 2014

(87) PCT Pub. No.: WO2013/140112
PCT Pub. Date: Sep. 26, 2013

(65) Prior Publication Data
US 2015/0084344 A1 Mar. 26, 2015

(30) Foreign Application Priority Data
Mar. 21, 2012 (GB) .................................. 1204910.2

(51) Int. Cl.
 *H02K 7/18* (2006.01)
 *F03G 7/08* (2006.01)
(52) U.S. Cl.
 CPC ............... *H02K 7/1853* (2013.01); *F03G 7/08* (2013.01)
(58) Field of Classification Search
 CPC .......... F03G 7/08; H02K 35/02; H02K 7/1853
 See application file for complete search history.

(56) References Cited

U.S. PATENT DOCUMENTS

| 1,916,873 A | 7/1933 | Wiggins |
| 3,895,236 A * | 7/1975 | Herron ...................... F03G 7/00 290/44 |

(Continued)

FOREIGN PATENT DOCUMENTS

| CA | 2412225 | 6/2004 |
| CN | 1877118 | 12/2006 |
| GB | 2457342 | 8/2009 |

OTHER PUBLICATIONS

UK Search Report issued in GB 1204910.2 on Apr. 20, 2012.
International Search Report issued in PCT/GB2013/000106 on Jul. 12, 2013.

*Primary Examiner* — Tulsidas C Patel
*Assistant Examiner* — Charles Reid, Jr.
(74) *Attorney, Agent, or Firm* — Stephen H. Eland; Dann, Dorfman, Herrell & Skillman

(57) ABSTRACT

An apparatus for road vehicles includes a sealed housing (07) which mounts the shafts (11 & 12) in bearings (10). Closed chain or belt loops (13) are driven by sprockets or pulleys (29) which are supported on the shafts (11 & 12) by one direction clutch bearings (09) such that the shafts (11 & 12) can only transmit power in a single direction (15). A multiple array of active elements (14) are activated by the vehicle wheels and have suitable means or geometry such that they transmit force to cause displacement of the chains or belts (13) and drive a generator (06) when activated but slip in the opposite return direction independently and without further effect to the chains or belts (13). A gearbox (28) may be used to change the shafts orientations. A multiple of chain or belt loops (13) are mounted to the shafts (11 & 12) at a suitable spacing in a direction perpendicular to the vehicle travel direction (04). The active elements (14) have means to bias them to return to their non-activated position after activation. The active elements (14) may (Continued)

operate further active elements having a means of one direction transmission of force to cause the chains or belts (13) to displace.

11 Claims, 15 Drawing Sheets

(56) References Cited

U.S. PATENT DOCUMENTS

| | | | |
|---|---|---|---|
| 4,238,687 A | 12/1980 | Martinez | |
| 4,434,374 A * | 2/1984 | Lundgren | F03G 7/08 290/1 R |
| 6,064,161 A * | 5/2000 | Takahara | B60W 10/04 180/197 |
| 6,858,952 B2 * | 2/2005 | Gott | F03G 7/08 290/1 R |
| 7,067,932 B1 * | 6/2006 | Ghassemi | H02K 7/1853 290/1 R |
| 7,629,698 B2 * | 12/2009 | Horianopoulos | F03G 7/08 290/1 R |
| 7,714,456 B1 * | 5/2010 | Daya | F03G 7/08 290/1 R |
| 8,334,603 B2 * | 12/2012 | Daya | B61C 3/00 290/1 C |
| 8,344,527 B2 * | 1/2013 | Becerra | F03G 7/08 290/1 R |
| 8,461,700 B2 * | 6/2013 | Kennedy | F03G 7/08 290/1 R |
| 8,786,115 B2 * | 7/2014 | Tort-Ortiz | H02K 7/1861 290/1 R |
| 8,803,341 B2 * | 8/2014 | Hendrickson | E01C 9/00 290/1 R |
| 9,006,916 B2 * | 4/2015 | Chiu | F03G 7/08 290/1 R |
| 2008/0224477 A1 * | 9/2008 | Kenney | F01D 17/26 290/1 R |
| 2010/0051389 A1 | 3/2010 | Chen | |
| 2012/0042738 A1 * | 2/2012 | Daya | B61C 3/00 74/25 |
| 2012/0049538 A1 * | 3/2012 | Periasamy | A43B 3/00 290/1 C |
| 2013/0020805 A1 * | 1/2013 | Sanchez Campos | F03G 7/08 290/52 |

* cited by examiner

DETAIL A

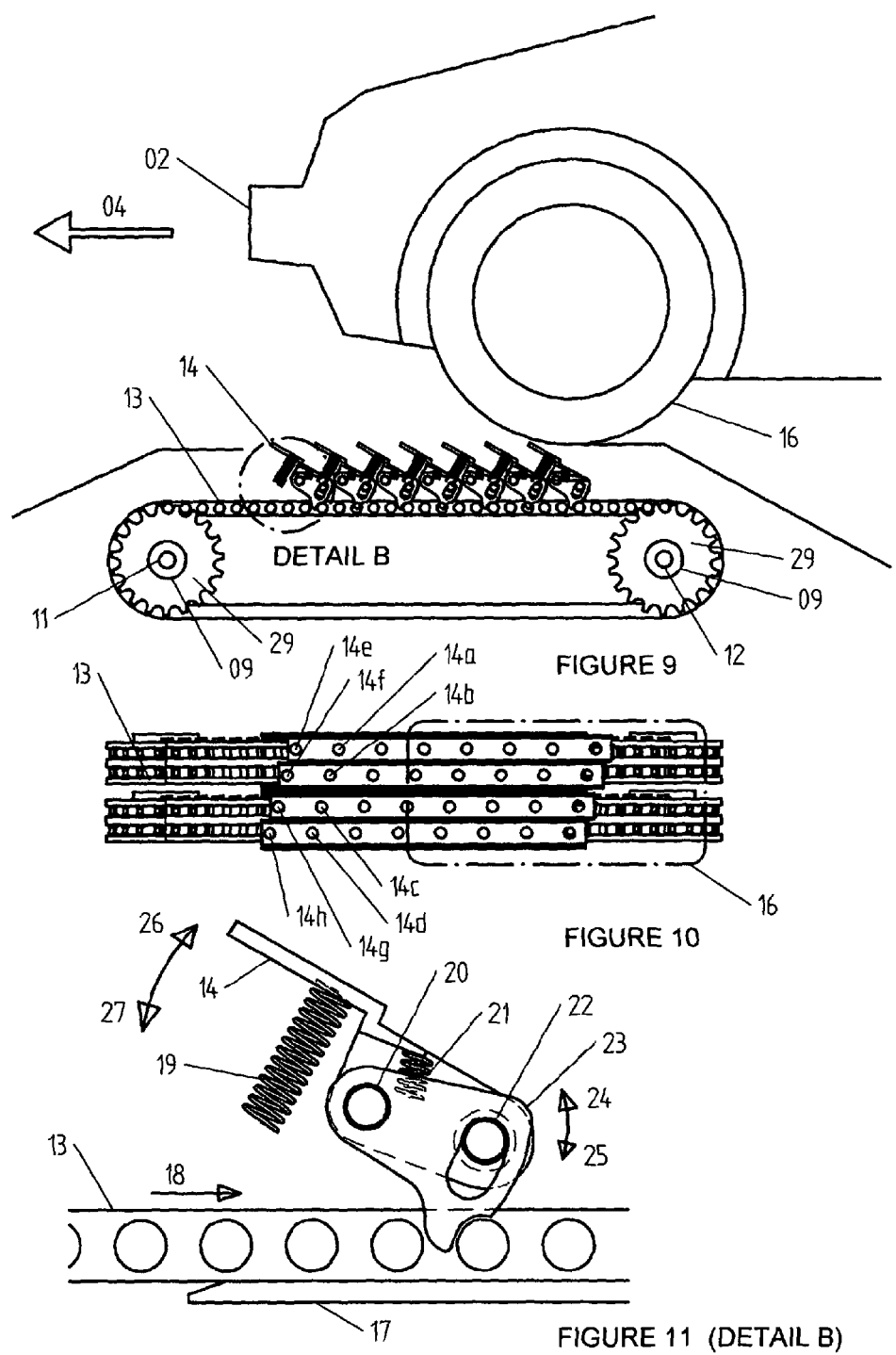

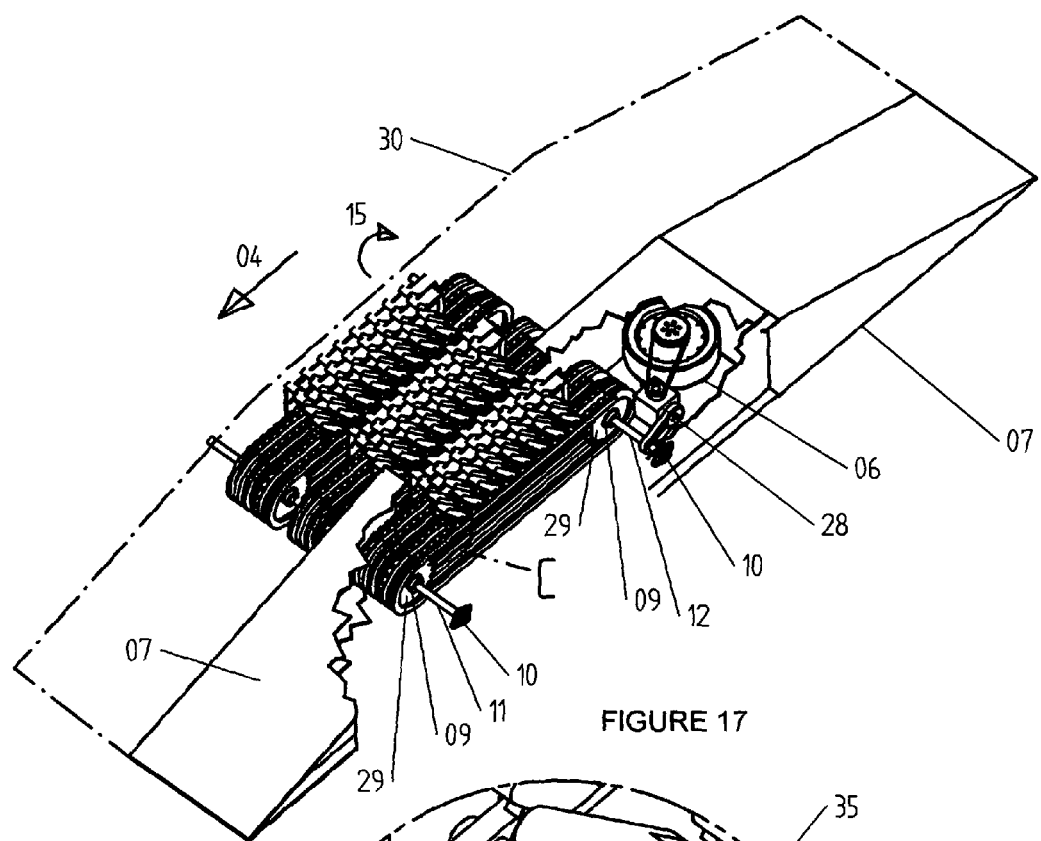
FIGURE 17
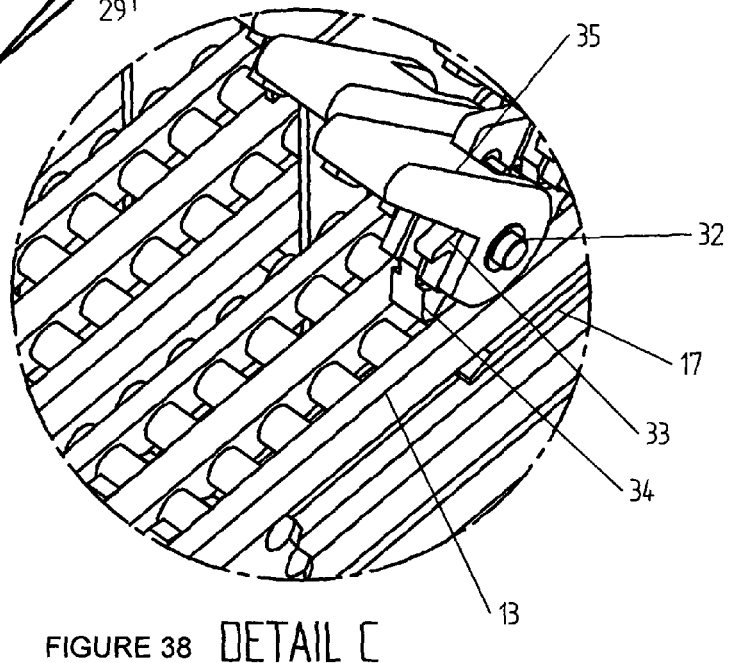
FIGURE 38 DETAIL C

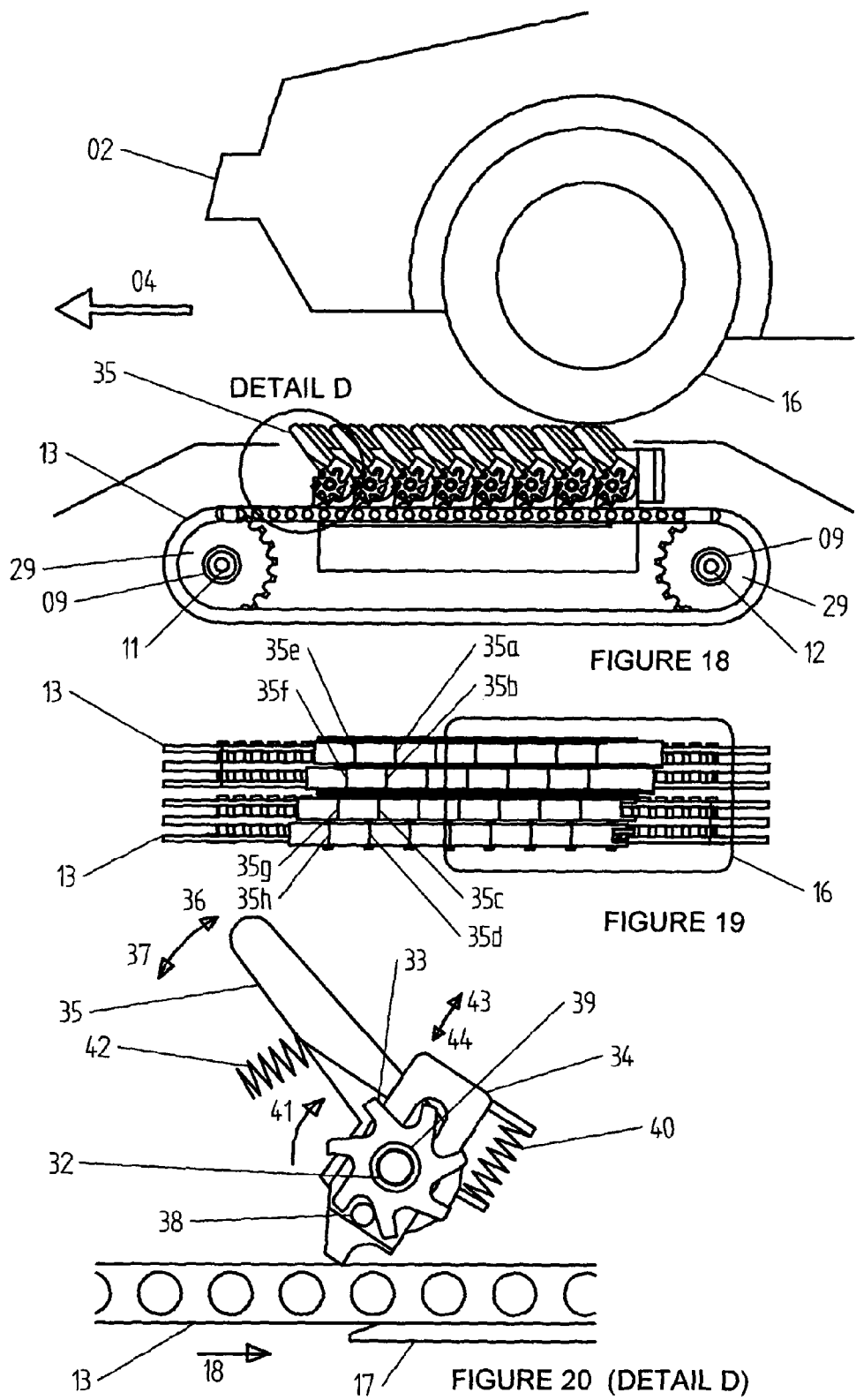

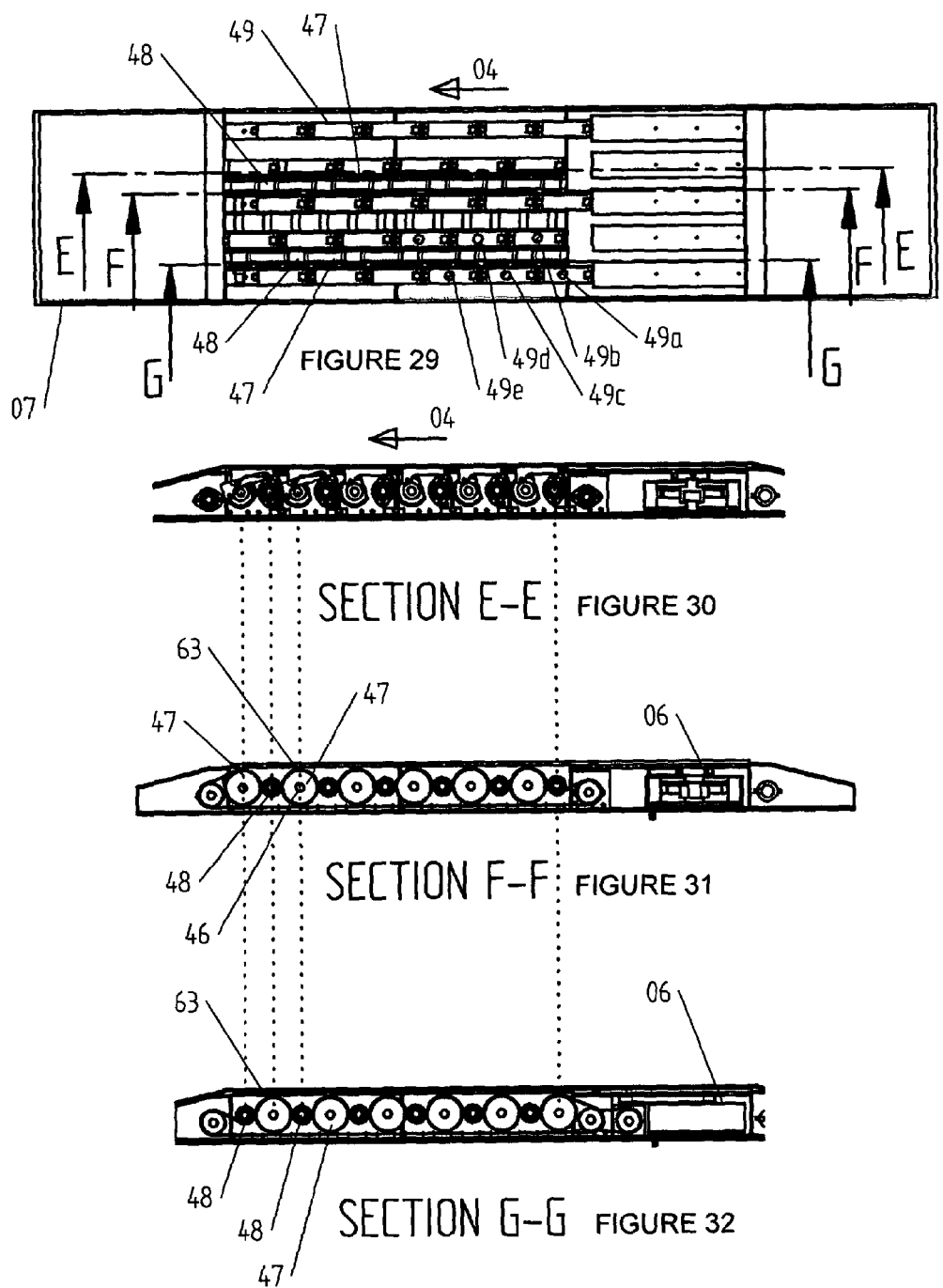

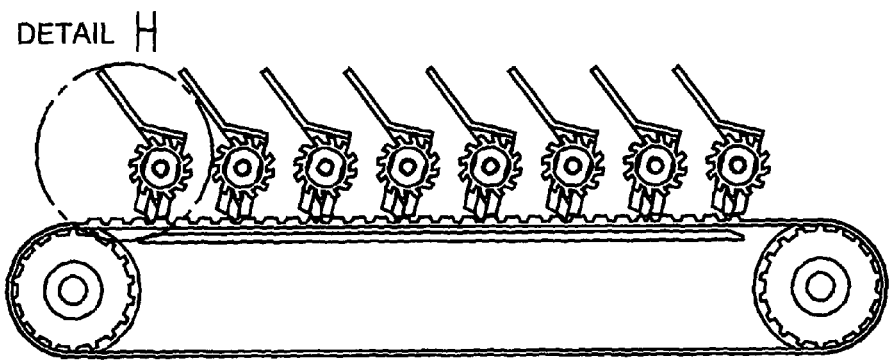
FIGURE 33
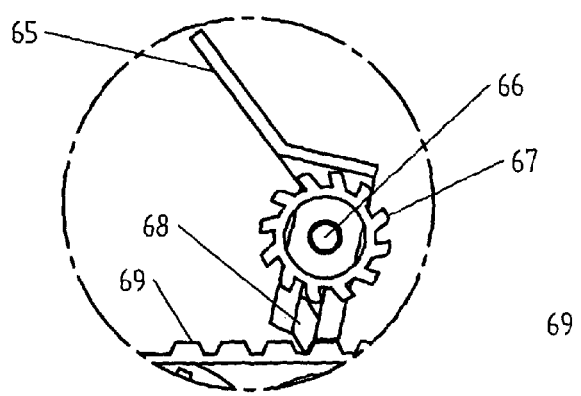
FIGURE 34 DETAIL H
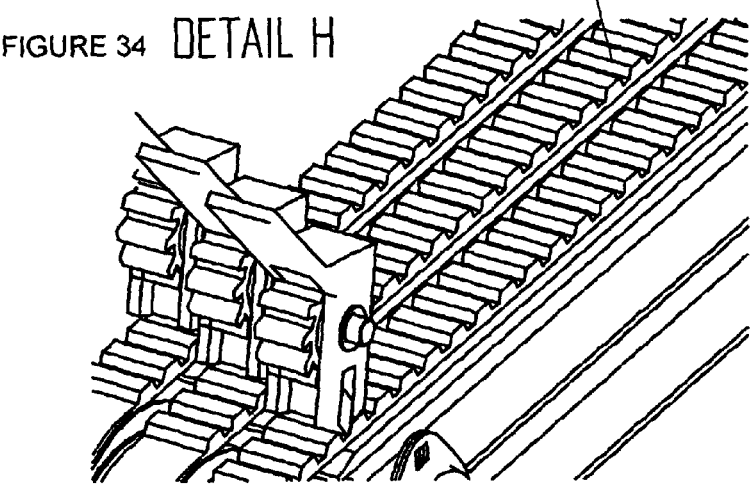
FIGURE 35

APPARATUS FOR ROAD VEHICLES

PRIORITY APPLICATIONS

This application is a 371 application of International Application No. PCT/GB2013/000106 filed Mar. 13, 2013, which claims priority to United Kingdom Patent Application No. 1204910.2 filed Mar. 21, 2012. The entire disclosure of each of the foregoing applications are hereby incorporated herein by reference.

BACKGROUND

Currently there are numerous pieces of apparatus which capture energy from natural sources, such as sunlight, wind, rain, tides and waves and geothermal heat. These can be summarised into the mainstream forms of renewable energy as below:—

Wind power, Hydropower, Solar power, Biomass, Bio fuel, Geothermal.

When vehicles, each with different weights, travel along a road surface, then the road surface must support the weight of the vehicle and therefore, potential energy is present because the road surface is preventing the vehicle moving under gravity in a vertical direction. This potential energy can be captured and converted into electrical energy. It would be beneficial to capture as much potential energy as possible, at any particular location, which may be desired, where road vehicles may drive frequently, and in large volumes. It would also be beneficial if the road vehicles driving path on the road surface, were not influenced by the means of capturing the energy.

STATEMENT OF INVENTION

To capture a high percentage of this energy, the present invention, proposes an active element which is biased to a normal non activated position by a suitable means and deflected from this position by the vehicle wheels to activate further elements, which may be constructed in such a way, or incorporate a suitable means of allowing transmission of force when activated, such as a one direction clutch bearing, to cause displacement of a belt or chain, but allow the active elements to return to their normal non activated positions independent of the chain or belt and whilst doing so, the belt or chain remains static with minimum forces acting upon it and displacement of the said belt or chain causes a generator mounted with its axis of rotation perpendicular to the road surface and the said active elements which cause the chain or belt to displace may be mounted in multiples at a suitable distance apart, along a suitable straight length of a closed loop of chain or belt spanning between driving sprockets or pulleys at each end, which are mounted in turn on a shaft at each end via one direction clutch bearings at one or both ends, such that the said shaft or shafts can transmit power when the said chain or belt is displaced and continue to rotate whilst the chain or belt is static in a freewheeling manner and furthermore, multiples of said active elements and belt or chain loops mounted on sprockets or pulley's may be mounted to the said shafts and spread over a suitable distance at a suitable spacing apart in a direction perpendicular to the direction of travel of the vehicles such as to allow activation by the vehicles wheels within a suitable percentage width of the road surface and such that each chain or belt loop can be displaced independently of each other to transmit power to the shafts and drive the generator, such that, only the active elements and chain or belt loops directly beneath the vehicles wheels are activated, whilst any others remain static and the said active elements causing displacement of said chain or belt may be offset in a diagonal array relative to the direction of travel of the vehicle, across the width of the road surface and relative to the minimum tire width of a vehicle such that for any given travel distance of the vehicle between said driving shafts, the chain or belt is displaced a maximum percentage of this distance to drive the generator for this corresponding time period.

Advantages

The generator is continuously operational for the same time period that the vehicle takes to pass from the start to end of the contact length of the active elements with the vehicle wheels, and this length can be as long as practical or desired so that the generator is operational for a large percentage of time within a given time period and based on the number and frequency of vehicles causing activation.

The generator is mounted with its axis of rotation perpendicular to the road surface such that all the means to cause generation of electricity are within a suitable housing mounted upon the surface of the road.

Only the chains or belts activated directly under the vehicles wheels at any instance will be displaced, whilst any others will remain static, therefore reducing inertia and frictional losses in the system and this means more energy can be transferred to drive the generator.

The active elements which are activated by the vehicles wheels are displaced a relatively small vertical distance to give a corresponding small incremental horizontal displacement of the driving chain or belt, but because there are many assemblies activated in succession, then the total combined incremental displacement of the chain or belt caused by activation of the active elements, by the vehicle wheels, is equal to the distance travelled over the active length of chain or belt between shaft centres.

The active elements activated by the vehicle wheels, can return to their normal non activated position, immediately after the wheels has passed over them so that they are ready to be activated once again almost immediately.

Preferably the apparatus has a number of closed loops of chain or belt spaced across a width of the road surface.

Preferably the closed loops of chain or belt are carried on sprockets or pulleys at each end which are mounted to drive shafts via one direction clutch bearings.

Preferably the shafts being driven by the chain loops are connected to a generator.

Preferably the apparatus has a number of active elements activated by the vehicles wheels presented in multiples and a suitable array.

Preferably the active elements have a means to transfer force when activated to displace a chain or belt and to return to their normal non activated position thereafter whilst not causing displacement of said chain or belt and with minimal transfer of any force to the chain or belt in a one directional clutch type of function.

Preferably the apparatus has a housing to contain the elements.

Preferably the apparatus has a generator within the housing.

Preferably the apparatus has a means to change the orientation of the output drive shafts prior to the generator.

Preferably the entire apparatus is sealed in a flexible weatherproof cover which can allow the active elements to displace beneath the vehicle wheels.

BRIEF DESCRIPTION OF THE DRAWINGS

The present invention will now be described with reference to the accompanying drawings in which:

FIG. 9 shows a side elevation of the embodiment shown in FIG. 6 or 8 and the path of a vehicle from right to left.

FIG. 10 shows a plan view of the embodiment shown in FIG. 9 and shows how the active elements are staggered across the width of the apparatus and this relationship to the vehicles wheels.

FIG. 11 shows an enlarged detail 'B' of a typical active element and associated elements as shown in FIG. 9 for this particular embodiment.

FIG. 17 shows an isometric view of one of a number of preferred embodiments where an active element is activated by the vehicles wheels to displace a chain or belt and drive a generator and the active elements has a means of transmitting force in the activating direction of travel by the inclusion of suitable constraints, and/or a one direction clutch bearing to allow easy slip in the opposite direction.

FIG. 38 shows an enlarged detail 'C' of the active elements and their relationship to the chain or belt as shown in FIG. 17.

FIG. 18 shows a side elevation of the embodiment shown in FIG. 17 and the path of a vehicle from right to left.

FIG. 19 shows a plan view of the embodiment shown in FIG. 18 and shows how the active elements are staggered across the width of the apparatus and this relationship to the vehicles wheels.

FIG. 20 shows an enlarged detail 'D' of a typical active element and associated elements as shown in FIG. 18 for this particular embodiment.

FIG. 29 shows a plan view of the embodiment shown in FIG. 26 and shows how the active elements are staggered across the width of the apparatus.

FIG. 30 shows a section view 'E-E' of the apparatus from FIG. 29 and shows the relationship of the active elements to each other.

FIG. 31 shows a section view 'F-F' of the apparatus from FIG. 29 and shows the relationship of the belt and pulleys to the active elements in a particular row across the width.

FIG. 32 shows a section view 'G-G' of the apparatus from FIG. 29 and shows the relationship of the belt and pulleys to the active elements in a particular row across the width.

FIG. 33 shows a side elevation of a variation to the embodiment as shown in FIGS. 17 and 18 where a toothed belt is used instead of a chain, but essentially other details are the same.

FIG. 34 shows an enlarged detail 'H' of a typical active element and associated elements as shown in FIG. 33 for this particular embodiment variation.

FIG. 35 shows an enlarged isometric view of the variation to the embodiment shown in FIG. 33 and the relationship with the active elements to the belt teeth.

DETAILED DESCRIPTION WITH REFERENCE TO DRAWINGS

Figure 1:
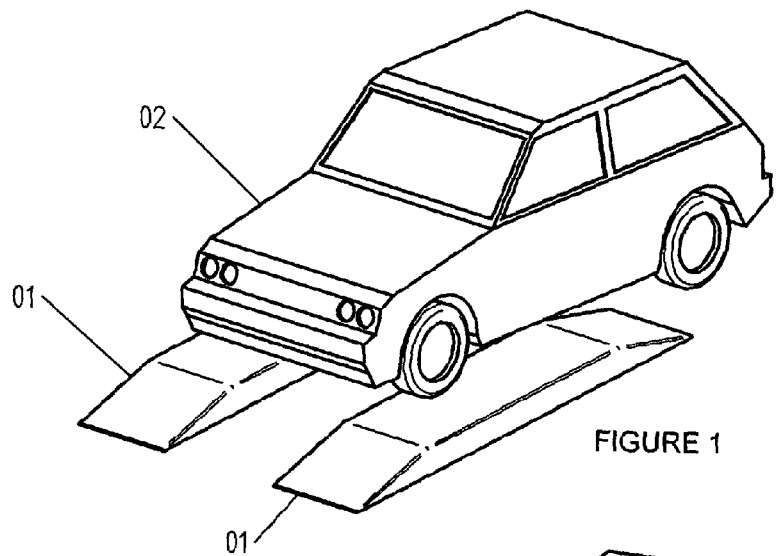
FIG. 1 is an isometric view showing how the apparatus is activated beneath the wheels of a vehicle.
Figure 2:
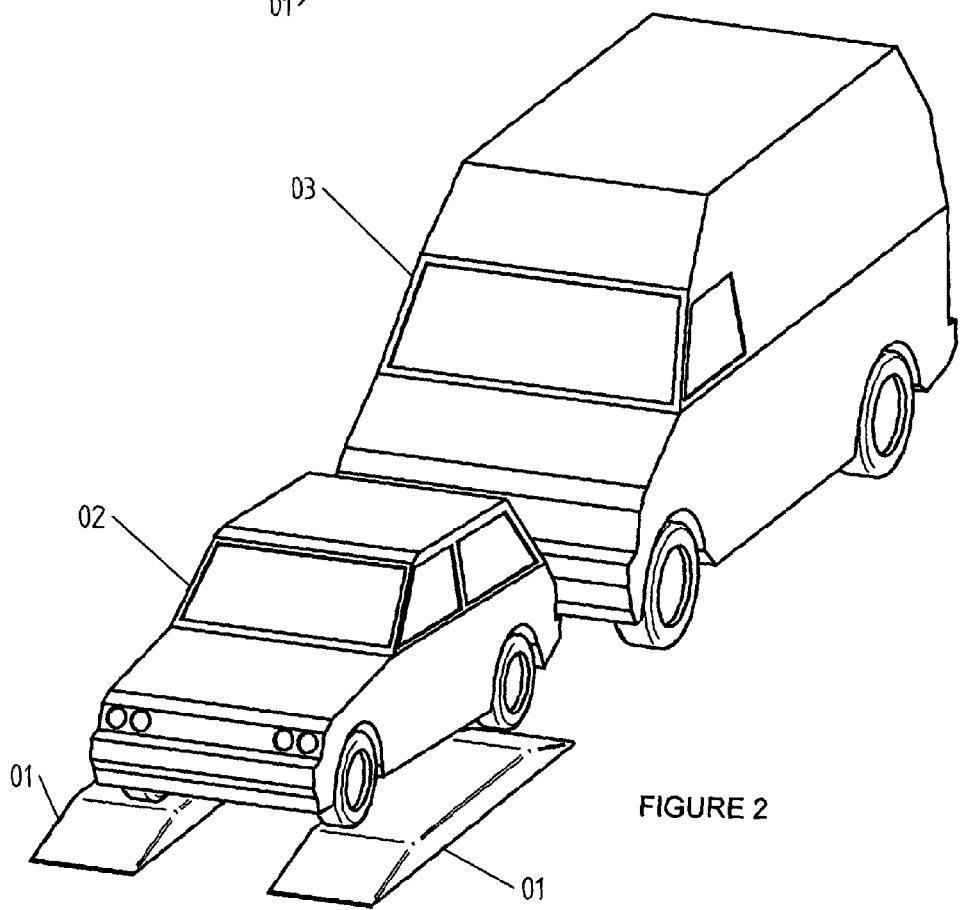
FIG. 2 is an isometric view showing how the apparatus is activated beneath the wheels of different types of vehicle such as a car or van for example travelling in succession behind, one another.

Please read in conjunction with the drawing sheets 1 to 15 inclusive.

Please note that the drawings describe alternative embodiments of the invention and share some common parts for descriptive purposes.

Figure 3:
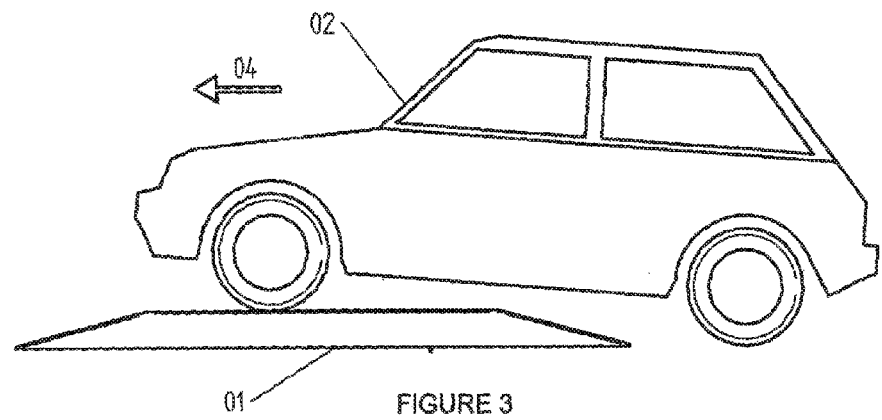
FIG. 3 is a side elevation of the proposed invention as described in FIGS. 1 & 2 showing the travel of a vehicle from right to left over the apparatus in a single zone configuration.

FIG. 3 shows how a typical vehicle 02 may travel in the direction of arrow 04 over the apparatus 01 which contains the active elements and generator within the housing. The entire apparatus may be sealed in a flexible water tight cover such that the top surface in contact with the vehicles wheels may suitably deflect as the active elements are activated. The distance from the first active element to the last in a direction of travel 04 of the vehicle 02 may be the zone length and this distance may be set as the same wheel base distance of the typical smallest vehicle so that the front set of wheels activate the apparatus first and then leave contact just as the rear set of wheels make contact thus maximising the operational time period of the apparatus. Any larger wheelbase vehicles will not have their front wheels in contact with the active parts of the apparatus at the same time as the rear wheels.

Figure 4:
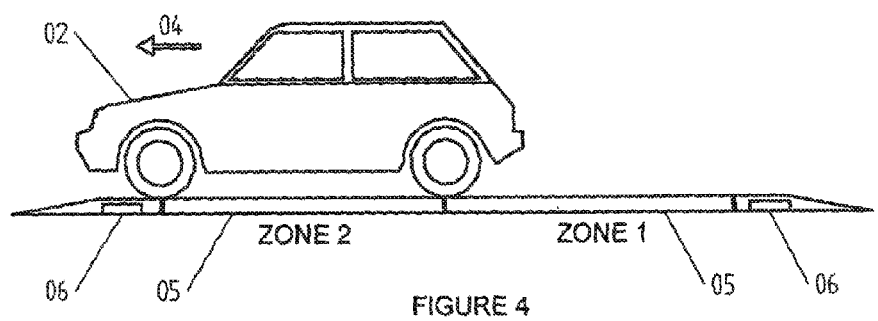
FIG. 4 is a side elevation of the proposed invention as described in FIG. 3 showing the travel of a vehicle from right to left over the apparatus in a two zone configuration, having means of electrical generation in each of the two zones.
Figure 5:
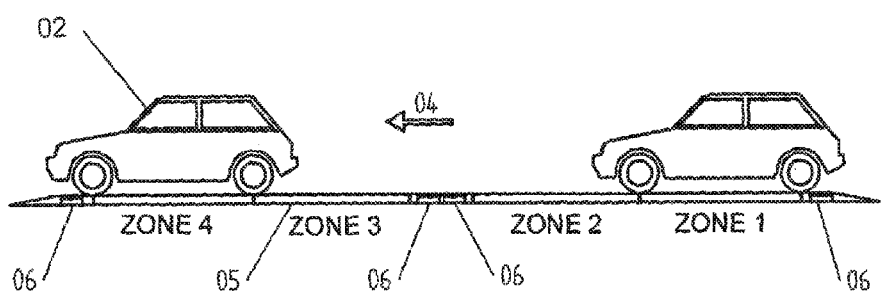
FIG. 5 is a side elevation of the proposed invention as described in FIGS. 3 & 4 showing the travel of two vehicles at a typical spacing apart from right to left over the apparatus, in a four zone configuration, having means of electrical generation in each of the four zones.

FIG. 4 shows a two zone apparatus with a typical vehicle 02 travelling over the zones 05 in a direction of travel 04 and a means to generate electricity 06 in each zone. When the front wheels start to activate zone 2 then the rear wheels are starting to activate zone 1. By making the apparatus modular with each unit self-contained with a generator, they can be made in a suitable multiple of zones and positioned in areas with a regular flow of vehicles to keep the apparatus activated for as large a percentage of time as possible. FIG. 5 shows a four zone apparatus with the vehicles 02 travelling in the direction of the arrow 04 and a suitable distance between them such that the zones 05 are activated to drive the generators 06 in each zone independently of each other.

Figures 6, 7:
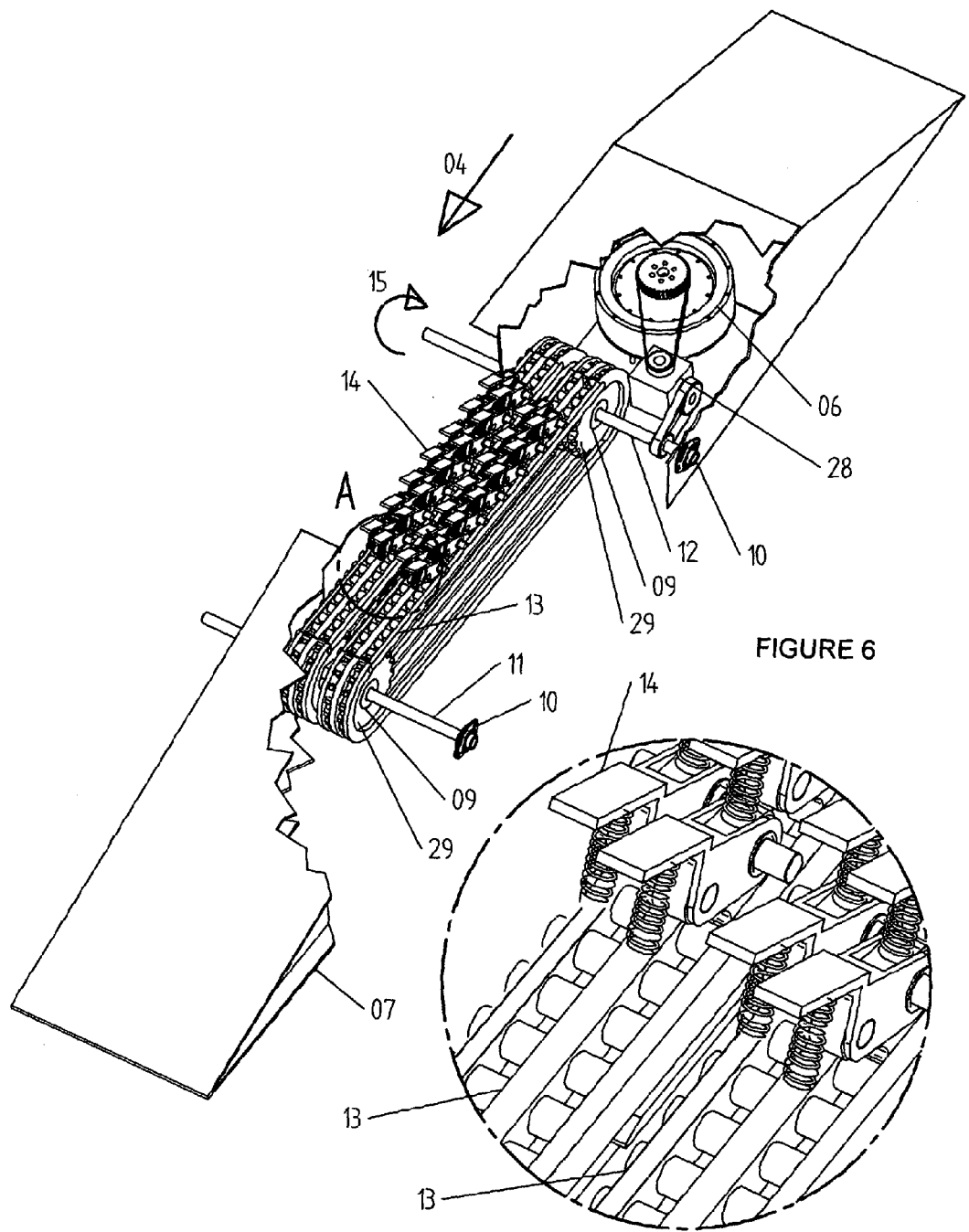
FIG. 6 shows an isometric view of one of a number of preferred embodiments where an active element is activated by the vehicles wheels to displace a chain or belt and drive a generator and the active elements has a means of transmitting force in the activating direction of travel by the inclusion of suitable constraints, but allow easy slip in the opposite direction.
FIG. 7 shows an enlarged detail 'A' of the active elements and their relationship to the chain or belt shown in FIG. 6.

In FIG. 6 an apparatus is shown for vehicles to pass over in the direction of travel 04 such that the active elements 14 are activated by the vehicles wheels. The housing 07 may have a weather proof flexible cover which is not shown in the drawing for clarity. Shafts 11 and 12 are mounted within the housing 07 and supported by suitable bearings 10. Sprockets 29 are mounted and supported on the shafts 11 and 12 by suitable bearing means 09. The sprocket 29 mounted on the shaft 12 has one directional clutch type bearings such that the sprocket 29 when rotated in the direction of the arrow 15 causes transmission of power to the shaft 12 causing it to be positively driven in the same direction as the sprocket, whilst slip will occur if the sprocket 29 remains static and the shaft 12 is driven in the direction of arrow 15 or if the shaft 12 remains static and the sprocket is driven in the opposite direction to arrow 15 or if either the shaft 12 or sprocket 29 are rotated in opposite directions to each other. The shaft 11 may have sprockets 29 with one way clutch type bearings 09 in the same manner described previously for shaft 12.

Closed loops of chain 13 wrap around the sprockets 29 on each of the shafts 11 and 12 and may be of the single strand, double strand or triple strand type also general known as simplex, triplex or duplex. An active element 14 acts upon the chain link roller when activated by the vehicles wheels to cause displacement of the chain 13 in the direction of travel opposite to the direction of travel 04 of the vehicle to cause transmission of power to shaft 12 which may drive a gearbox 28 to change the orientation of the output shafts which in turn drives a generator 06 by a suitable driving means which may be a belt or chain for example.

FIG. 7 shows an enlarged DETAIL A from FIG. 6, showing the active elements 14 and their relationship to the chains 13. In the example shown in FIG. 6 the number of active elements and chain loops positioned along the length of shafts 11 and 12 is equal to the minimum tire width of a vehicle and in this example there are four rows of active elements 14 to be activated by the tire width of the vehicle.

Figure 8:
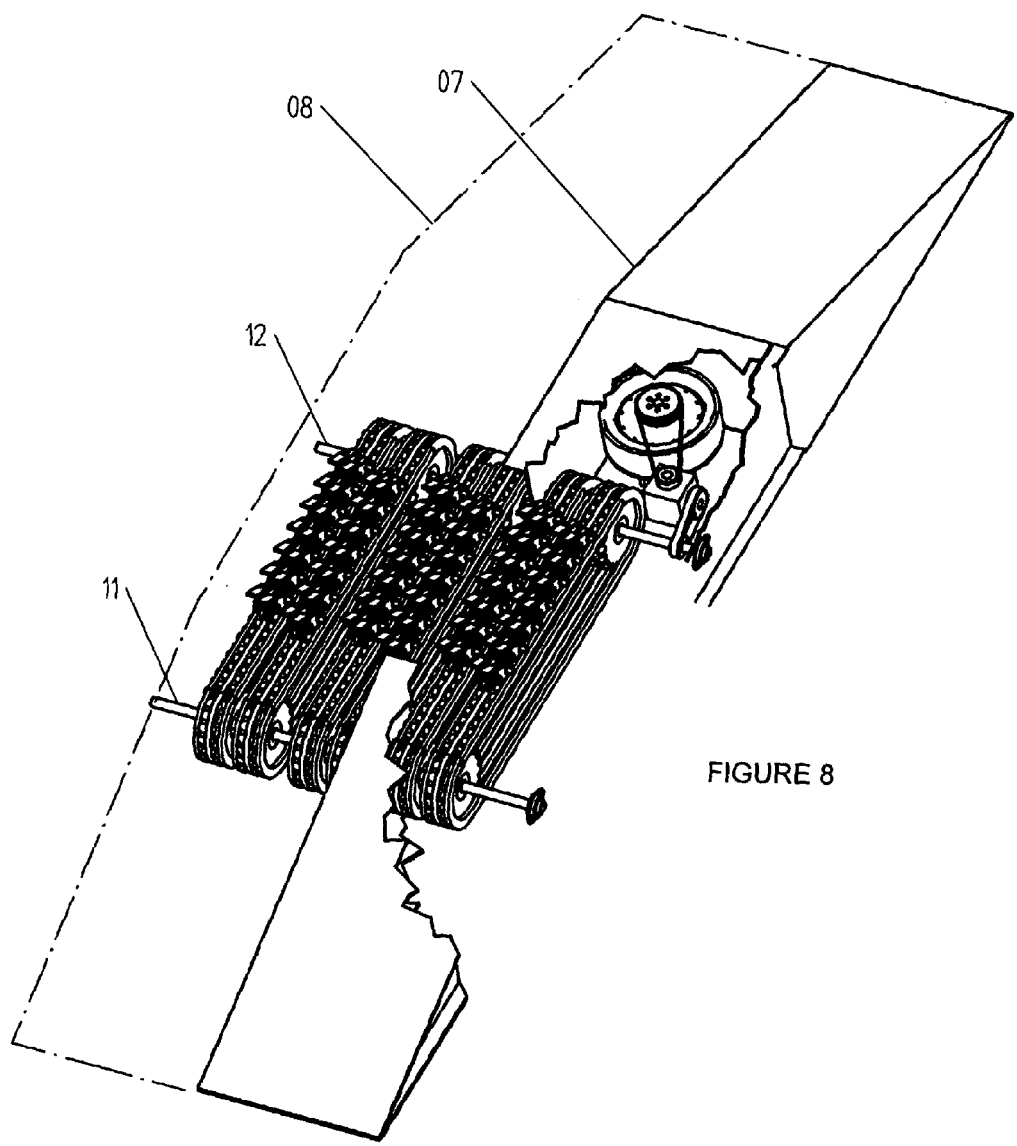
FIG. 8 shows a variation of the embodiment shown in FIG. 6 where multiple chain or belt loops are added so that a vehicles path taken on the road surface is less restricted whilst the apparatus will still be activated.

FIG. 8 shows how a greater tolerance of position of the vehicle wheels across the width of the apparatus, may be accommodated by adding more rows of active elements 14 and associated chains 13 along the length of shafts 11 and 12 in a suitable housing 08. FIG. 9 shows a side elevation of the apparatus as shown in FIG. 6 with the wheels 16 of a vehicle 02 travelling in the direction of arrow 04 starting to activate the active elements 14 to cause displacement of the chains 13 and rotation of the sprockets 29 mounted on suitable bearings, 09 on the shafts 11 and 12. FIG. 10 shows a plan view of FIG. 9 and shows how the active elements 14a, 14b, 14c and 14d are suitably offset or staggered a distance in a direction of travel of the vehicle 04 and their position such to be activated by the vehicles wheels 16 in succession.

For explanation purposes, at a particular position of the vehicle on the apparatus in the direction of arrow 04 then 14a element will activate first, and then as the vehicle continues to travel 14b, 14c and 14d will be activated in succession and this sequence is repeated such that elements 14e, 14f, 14g and 14h will activate in succession, etc., for the length of travel of the vehicle over the number of active elements provided. The distance of travel of the vehicle 02 in the direction of arrow 04 from a typical active element 14a to 14e operated by the vehicle wheels 16 causes the chains 13 to displace, ideally an equal distance in a direction opposite to arrow 04 such that continuous displacement of the chains 13 occurs in increments, the total of which is equal to the travel distance of the vehicle upon the apparatus and thus drive a generator 06 continuously. The apparatus may be as long as desired or may be connected to form zones as shown in FIGS. 4 and 5 to capture a larger percentage of energy as the vehicle is in contact with the apparatus for a longer time period.

FIG. 11 shows an enlarged DETAIL B from FIG. 9 of a typical active element 14 and associated components. The active element 14 is displaced in the direction of arrow 27 by the vehicle wheels from its normal none activated position. A suitable means is provided, such as a spring 19 to make the active element 14 bias to return to its none activated normal position, when not activated. The active element 14 can rotate around a pivot pin 22 and suitable bush mounted to the housing 07 shown in FIG. 6. An element 23 is provided which is biased to a normal position by a suitable means such as a spring 21 for example and be of such a form and mounting that it can displace in the direction of arrows 24 and 25 about the pivot pin and bush 20 mounted to the active element 14 and independently of the displacement of the active element 14. It may be appreciated that the active element 14 may be of such a suitable form and material so as to combine the two elements 14 and 23 into one component of suitable material.

When the active element 14 is activated in the direction of arrow 27 a one directional form of operation is achieved such that the element 23 cannot displace from its normal position in the direction of arrow 25 relative to the element 14 and a direct transfer of force is provided by the element 23 to the chains 13 to cause displacement in the direction of arrow 18. The element 23 can displace in the direction of arrow 24 independently of element 14 and regardless of the position of element 14 such that at any instance or state of operation, the element 23 can displace in the direction of arrow 24 to allow the chain 13 to move past and may also return to its normal position in the direction of arrow 25 provided the chain 13 is in a suitable condition of displacement in the direction of arrow 18. The chain 13 is supported on suitable supports 17 mounted to the housing 07 shown in FIGS. 6 and 11.

Figure 12:
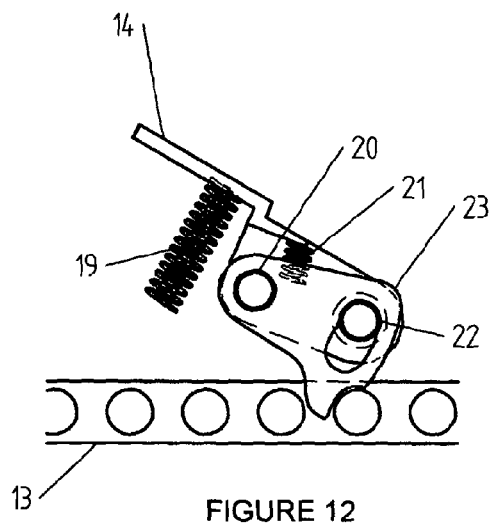
FIGS. 12 to 16 inclusive, shows a side elevation of the active element and associated active elements in the apparatus shown in FIG. 6 for this particular embodiment and their sequence of operation.
Figure 13:
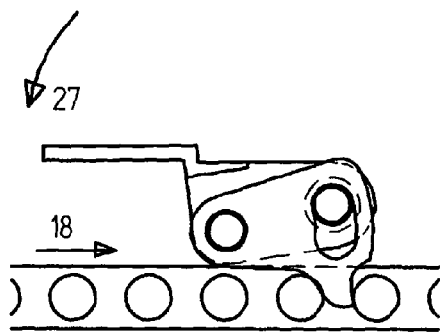
Figure 14:
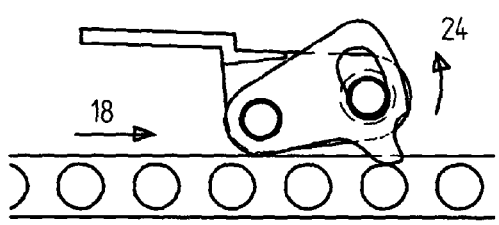
Figure 15:
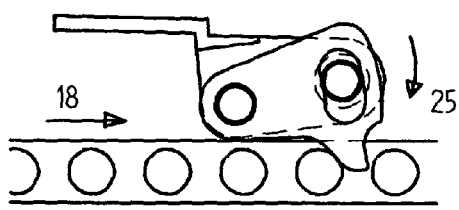
Figure 16:
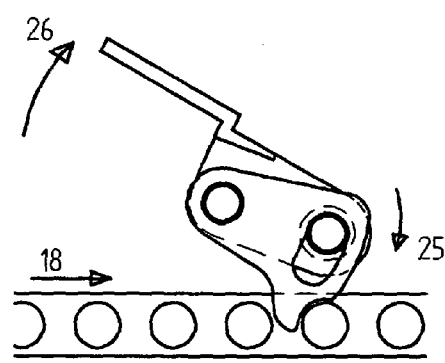

FIGS. 12 to 16 inclusive show a typical sequence of operation. With reference to FIG. 12 the active element 14 and 23 are biased to their normal none activated positions by suitable means such as springs 19 and 21 relative to the chain 13. The element 23 may pivot about the pin 20 mounted to the element 14 which in turn pivots about the pin 22 mounted to the housing. FIG. 13 shows the active element 14 activated by the vehicles wheels to cause displacement in the direction of arrow 27. In this direction the element 23 cannot be displaced relative to element 14 and so displaces the chain 13 in the direction of arrow 18 a suitable distance which may be half of the pitch of the chain 13 link rollers. At this instance, the state of the active elements shown in FIG. 13 would correspond to the active element 14a shown in FIG. 10 for example and when the next successive active element 14b is activated acting on the adjacent part of the double row configuration of chain 13, then the state of the active element 14a may be as shown in FIGS. 14 and 15 in two steps to help clarify the sequence as the chain 13 is further displaced in the direction of arrow 18 a further distance which may be half the pitch of the chain 13 link rollers. The element 23 is allowed to displace in the direction of arrow 24 shown in FIG. 14 from its normal position and when the next successive active element 14e with respect to and acting on the same chain loop system 13 is activated and which is spaced a suitable distance in the direction of travel of arrow 04 as shown in FIGS. 9 and 10 then the state of the active elements may be as shown in FIG. 15 and subsequently, the active element 14 may return in the direction of arrow 26 to its none activated position and the element 23 may return in the direction of arrow 25 to its none activated position both as shown in FIG. 16 to commence the sequence again.

The distance between the active elements 14a and 14e in a direction of travel of the vehicle 04 may be a multiple of the chain pitch and four rows of active elements (14a,14b, 14c,14d) operated by the width of tire 16 may give a distance of four times a half pitch which may equal two pitches travel in total and so elements 14a and 14b may give one pitch of travel whilst 14c and 14d may give the remaining two half pitches of travel to ensure the displacement of chains 13 are maximised.

FIG. 10 shows two loops of double row chains 13 which are independent and because they are mounted on one direction clutch type bearings 09 in the sprockets 29 and in turn on the shafts 11 and 12 then both loops can operate at only the desired interval such that inertia and friction is minimised. In a similar manner only the active elements beneath the vehicles wheels are activated and so only these corresponding chain loops are displaced, again reducing inertia and friction.

The double row chain loops 13 as shown in FIG. 10 may have their sprockets 29 connected and mounted on common one directional clutch type bearings 09 so that both chains displace together when activated by any one of the active elements 14a, 14b, 14c or 14d for example across the width of the tire 16.

FIG. 17 shows an alternative embodiment where the apparatus and functionality is essentially the same as described previously, but the active elements differ.

Vehicles pass over the apparatus in the direction of travel 04 such that the active elements 35 are activated by the vehicles wheels. The housing 07 may have a weather proof flexible cover which is not shown in the drawing for clarity. Shafts 11 and 12 are mounted within the housing 07 and supported by suitable bearings 10. Sprockets 29 are mounted and supported on the shafts 11 and 12 by suitable bearing means 09. The sprocket 29 mounted on the shaft 12 has one directional clutch type bearings such that the sprocket 29 when rotated in the direction of the arrow 15 causes transmission of power to the shaft 12 causing it to be positively driven in the same direction as the sprocket, whilst slip will occur if the sprocket 29 remains static and the shaft 12 is driven in the direction of arrow 15 or if the shaft 12 remains static and the sprocket is driven in the opposite direction to arrow 15 or if either the shaft 12 or sprocket 29 are rotated in opposite directions to each other. The shaft 11 may have sprockets 29 with one way clutch type bearings 09 in the same manner described previously for shaft 12.

Closed loops of chain 13 wrap around the sprockets 29 on each of the shafts 11 and 12 and may be of the single strand, double strand or triple strand type also generally known as simplex, duplex or triplex. An active element 35 acts upon the chain link roller when activated by the vehicles wheels to cause displacement of the chain 13 in the direction of travel opposite to that of the vehicle 04 to cause transmission of power to shaft 12 which may drive a gearbox 28 to change the orientation of the output shafts which in turn drives a generator 06 by a suitable driving means which may be a belt or chain for example.

FIG. 38 shows an enlarged DETAIL C from FIG. 17, showing the active elements and their relationship to the chains 13. In the example shown in FIG. 17 the number of active elements and chain loops positioned along the length of shafts 11 and 12 is equal to approximately three times the minimum tire width of a vehicle and in this example there are twelve rows of active elements 35 to be activated by the tire width of the vehicle showing how a greater tolerance of position of the vehicle wheels across the width of the apparatus, may be accommodated by adding more rows of active elements 35 and associated chains 13 along the length of shafts 11 and 12 in a suitable housing 07 and 30.

FIG. 18 shows a side elevation of the apparatus as shown in FIG. 17 with the wheels 16 of a vehicle 02 travelling in the direction of arrow 04 starting to activate the active elements 35 to cause displacement of the chains 13 and rotation of the sprockets 29 mounted on suitable bearing 09 on the shafts 11 and 12.

FIG. 19 shows a plan view of FIG. 18 and shows how the active elements 35a, 35b, 35c and 35d are suitably offset or staggered a distance in a direction of travel of the vehicle 04 and their position such to be activated by the vehicles wheels 16 in succession.

For reference purposes, using FIG. 19, at a particular position of the vehicle on the apparatus in the direction of arrow 04 then 35a element will activate first, and then as the vehicle continues to travel 35b, 35c and 35d will be activated in succession and this sequence is repeated such that elements 35e, 35f, 35g and 35h will activate in succession, etc., for the length of travel of the vehicle over the number of active elements provided. The distance of travel of the vehicle 02 in the direction of arrow 04 from a typical active element 35a to 35e operated by the vehicle wheels 16 causes the chains 13 to displace, ideally an equal distance in a direction opposite to arrow 04 such that continuous displacement of the chains 13 occurs in increments, the total of which is equal to the travel distance of the vehicle upon the apparatus and thus drive a generator 06 continuously. The apparatus may be as long as desired or may be connected to form zones as shown in FIGS. 4 and 5 to capture a larger percentage of energy as the vehicle remains in contact with active elements for a longer time period.

FIG. 20 shows an enlarged DETAIL D from FIG. 18 of a typical active element 35 and associated components. The active element 35 is displaced in the direction of arrow 37 by the vehicle wheels from its normal none activated position. A suitable means is provided, such as a spring 42 to make the active element 35 bias to return to its none activated normal position, when not activated. The active element 35 can rotate around a pivot pin 32 and suitable bush 39 mounted to the housing 07 shown in FIG. 17.

An element 34 is provided which is mounted to the active element 35 to move with it and is biased to a normal position by a suitable means such as a spring 40 for example and of such a form and mounting that it can displace only in the direction of arrows 44 and 43 and restrained in any other direction.

The element 34 may displace independently of the displacement of the active element 35. It may be appreciated that the active element 35 may be of such a suitable form and material so as to combine the two elements 35 and 34 into one component of suitable material.

A suitably profiled cam means 33 is provided which rotates on the pivot pin 32 and contains a suitable means which may be a one directional clutch type bearing such that the relative position of the cam profile 33 to the active element 35 is locked when the active element travels in the direction of arrow 37 but can freely rotate in the opposite direction of arrow 41. The pivot pin 32 is fixed and locked relative to the housing 07.

A suitable engagement 38 is provided in the element 34 which engages the cam profile 33. When the active element 35 is activated in the direction of arrow 37 the cam profile cannot rotate in the same direction and so the element 34 and its engagement 38 is forced to follow the profile of the cam, thus causing displacement of the element 34 in the direction of arrow 44 such to engage the chain 13 link rollers and cause displacement of the chain 13 in the direction of arrow 18. The profile of the cam 33 is such so as to maintain engagement of the element 34 with the chain 13 until the end of the stroke of the element 35.

At the end of the working stroke of the active element 35 the engagement 38 clicks past the tooth profile of the cam 33 to allow the element 34 to retract from engagement with the chain 13 in the direction of arrow 43 and the active element 35 returns to its normal none active position in the direction of arrow 36 in synchronisation with the cam profile 33 which rotates in the direction of arrow 41 simultaneously with the element 35. The cam profile 33 has suitable form so that the sequence may be repeated instantly. The chain 13 is supported in the housing 07 by suitable supports 17.

FIGS. 21 to 25 inclusive show a typical sequence of operation. The means of bias to a non-activated position 42 and 40 have been removed for clarity.

Figure 21:
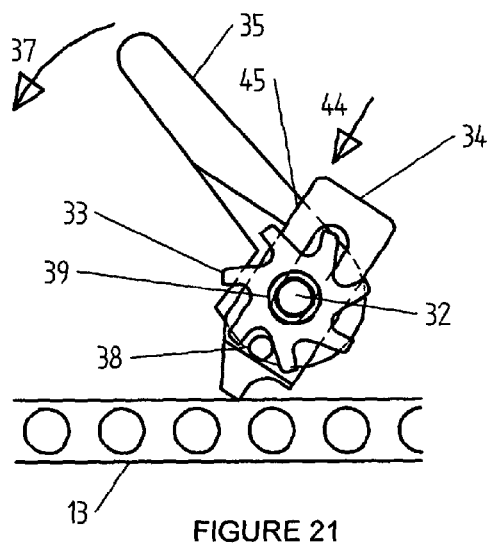
FIGS. 21 to 25 inclusive, shows a side elevation of the active element and associated active elements in the apparatus shown in FIG. 17 for this particular embodiment and their sequence of operation.

With reference to FIG. 21 the active elements 35 and 34 are biased to their normal none activated positions by suitable means such as springs 42 and 40 relative to the chain 13.

At a typical instance FIG. 19 may be referenced to show the interactive nature of the elements 35 and for explanation purposes the status shown in FIG. 21 corresponds to 35*a* in FIG. 19.

Figure 22:
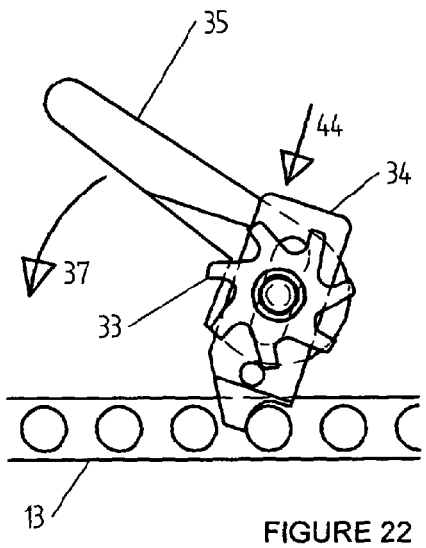
Figure 23:
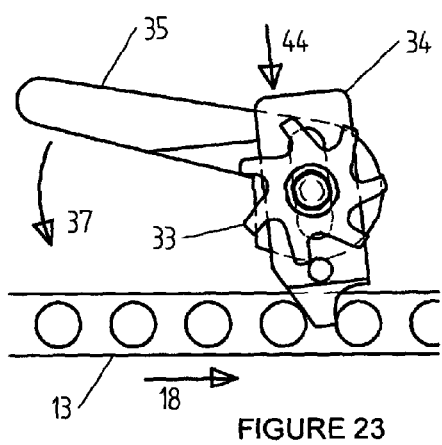

FIG. 22 shows the element 35 is partially activated in the direction of arrow 37 by the vehicles wheels and pivots about the pin 32 which is rigidly restrained from any displacement in the housing 07. The cam profile 33 contains a suitable means 39 which may be a one directional clutch bearing, such to only allow rotation of the cam profile in the direction of arrow 41 on the pivot 32 as shown in FIG. 20 and will not rotate in the opposite direction relative to the pivot pin 32. A suitable form is provided 45 in the element 35 such to only allow displacement of the element 34 in the direction of arrows 43 and 44. As the active element 35*a* with reference to FIG. 19 is displaced the cam profile 33 remains static which forces the element 34 to displace by contact with the engagement means 38 in the direction of arrow 44 to firstly engage the chain 13 link roller and then subsequently maintain engagement as shown in FIG. 23 to displace the chain 13 in the direction of arrow 18.

Figure 24:
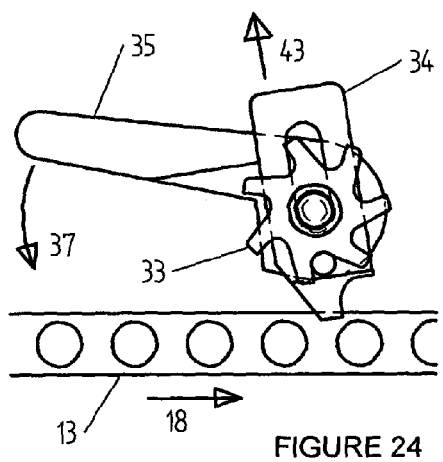
Figure 25:
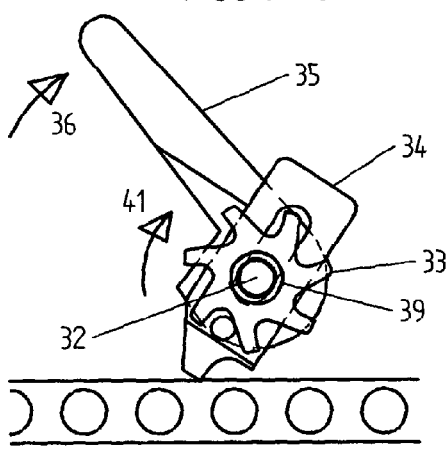

At the end of the stroke of the active element 35*a* with reference to FIGS. 19 and 24 the engagement means 38 drops into the cam profile 33 relief to allow disengagement of the element 34 from the chain 13 and displace to its non-activated normal position in the direction of arrow 43 and simultaneously the active element 35*a* can displace independently to element 34 in the direction of arrow 36 to its non-activated normal position and whilst doing so the cam profile 33 rotates in synchronisation about the pivot pin 32 in the direction of arrow 41 as shown in figure to allow instant repeat of the sequence. The active element 35*a* acts on one pad of the double row chain 13 and at the end of its stroke a suitable displacement of the chain 13 has taken place which is related to the chain 13 roller pitch of the links.

Active element 35*b* is instantly activated in succession to complete the identical displacement of chain 13 in the direction of arrow 18 and elements 35*a* and 35*b* are suitably staggered in distance in a direction of travel 04 of the vehicle 02 as shown in FIGS. 18 and 19. Elements 35*c* and 35*d* are staggered in an identical manner and perform the identical sequence as 35*a* and 35*b* The distance between the active elements 35*a* and 35*e* in a direction of travel of the vehicle 04 is a suitable distance which may be a multiple of approximately one half of the chain pitch. Four rows of active elements operated by the width of tire may give a distance of four times a half pitch which equals two pitches travel in total and so elements 35*a* and 35*b* may give one pitch of travel whilst 35*c* and 35*d* gives the remaining two half pitches of travel to ensure the displacement of chains 13 are maximised.

FIG. 19 shows two loops of double row chains 13 which are independent and because they are mounted on one direction clutch type bearings 09 in the sprockets 29 and in turn on the shafts 11 and 12 then both loops can operate at only the desired interval such that inertia and friction is minimised. In a similar manner only the active elements beneath the vehicles wheels are activated and so only these corresponding chain loops are displaced, again reducing inertia and friction.

The double row chain loops 13 as shown in FIG. 19 may have their sprockets 29 connected and mounted on common one directional clutch type bearings 09 so that both chains displace together when activated by any one of the active elements 35*a*, 35*b*, 35*c* or 35*d* for example across the width of the tire 16.

FIG. 33 shows an alternative embodiment of the invention where a suitable belt is used instead of chain but essentially all other details and functions of the previous embodiments would apply. The belt may have suitable tooth profiles in a regular pitch such that they may be engaged by the active elements described previously to cause displacement and rotation of the pulleys. FIG. 34 shows an enlarged DETAIL H from FIG. 33 which may be compared to FIG. 20 to show the common functionality of the elements.

The active element 65 in FIG. 34 compares to 35 in FIG. 20. The belt 69 in FIG. 34 compares to the chain 13 in FIG. 20. The element 68 in FIG. 34 compares to the element 34 in FIG. 20. The cam profile 67 in FIG. 34 compares to the cam profile 33 in FIG. 20. The pivot pin 66 in FIG. 34 compares to the pivot pin 32 in FIG. 20.

FIG. 35 shows an enlarged view of the active elements and their relationship to the toothed belt in a staggered position along the belt length in a direction of travel of the vehicle and may be compared to FIG. 38. Other details are as described for the previous embodiments.

Figure 36:
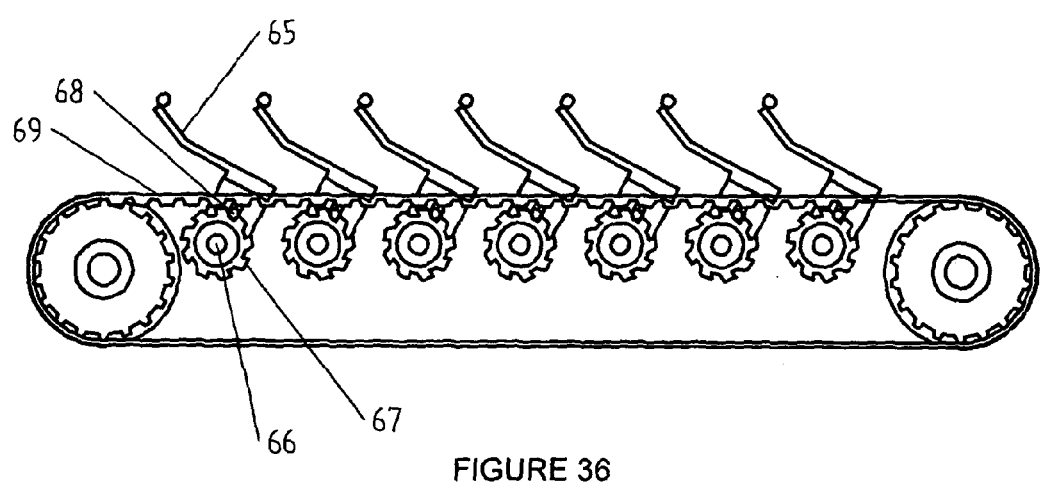
FIG. 36 shows a side elevation of a variation to the embodiment as shown in FIG. 33 where a toothed belt is used and the active elements causing displacement of the belt are contacting the opposite side of the belt, but essentially other details are the same.

FIG. 36 shows a further alternative embodiment which essentially is the same as previously described for the embodiment utilising a toothed belt 69 in FIGS. 33, 34 and 35 but the active engagement of the element 68 is on the opposite side of the belt.

Figure 26:
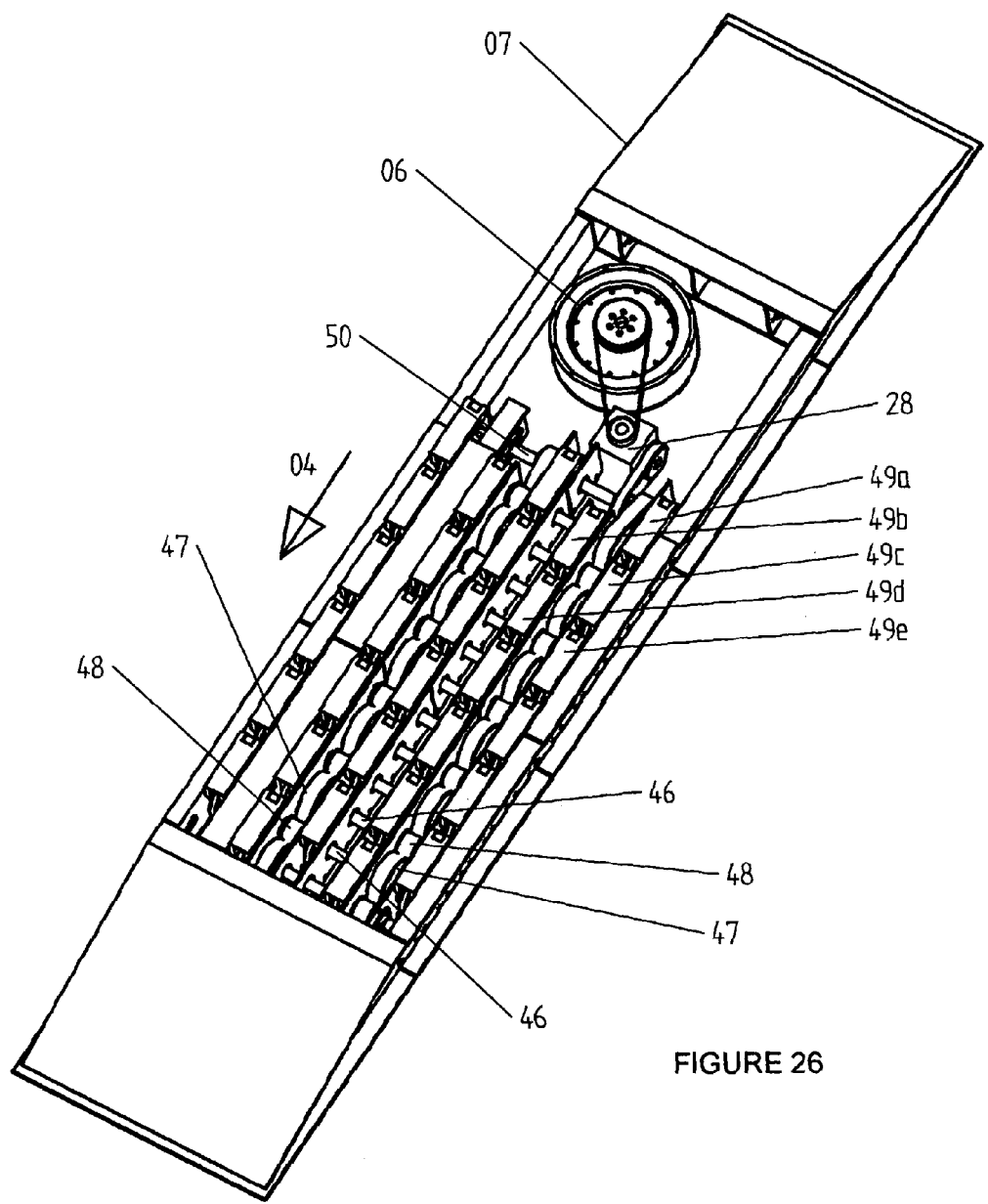
FIG. 26 shows an isometric view of one of a number of preferred embodiments where an active element is activated by the vehicles wheels to displace a chain or belt and drive a generator and the active elements has a means of transmitting force in the activating direction of travel by the inclusion of suitable constraints, and/or a one direction clutch bearing to allow easy slip in the opposite direction.

FIG. 26 shows an alternative embodiment of the apparatus 01 as shown in FIG. 1

Vehicles pass over the apparatus in the direction of travel 04 such that the active elements 49 are activated by the vehicles wheels. The housing 07 may have a weather proof flexible cover which is not shown in the drawing for clarity.

Figure 28:
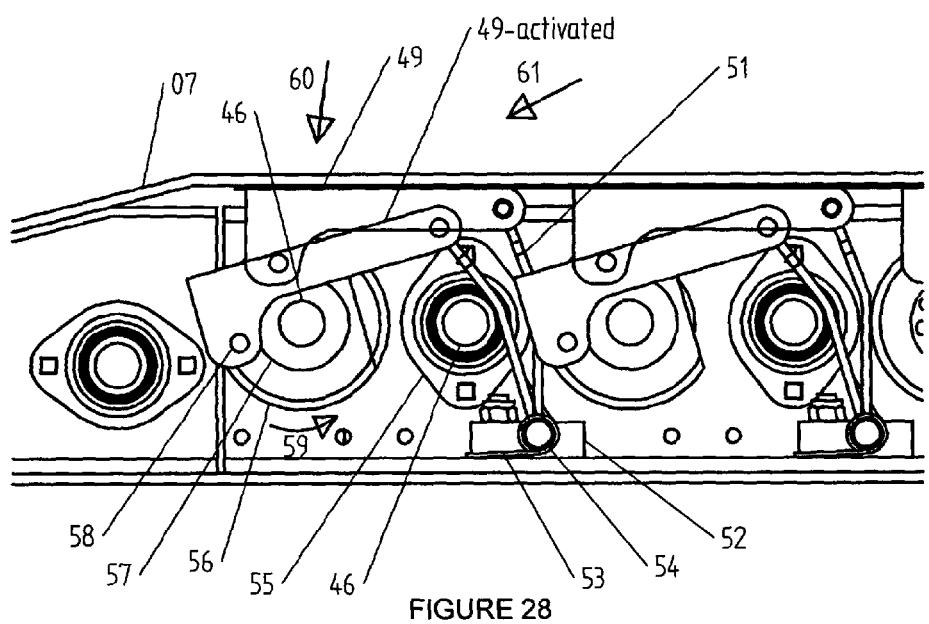
FIG. 28 shows an enlarged side elevation cut away view of a section of the apparatus as shown in FIGS. 26 and 27 to show the active elements relationship to each other.

Shafts 46 are mounted within the housing 07 and typically supported at suitable positions by bearings 55 as shown in FIG. 28. The shafts 46 span the desired width of the apparatus and may be spaced apart the equivalent distance of two times the displacement of each belt loop 63 caused by the activation of the elements 49.

To enable the shafts 46 to be mounted as close together as possible a dual belt system is provided and the relative positions may be seen in FIG. 29 and the section view F-F shown in FIG. 31 and section view G-G as shown in FIG. 32. At any particular instance along the direction of travel 04 then a shaft 46 as shown for example in FIG. 31 has a pulley 47 driving one of the belt loops 63 and an idler pulley 48 as shown in FIG. 32 for the second belt loop.

Any of the active elements 49 connected to one particular shaft 46 causes displacement of one of the belt loops 63 whilst any of the active elements 49 connected to a shaft 46 immediately upstream or downstream of the said shaft in a direction of travel 04 causes displacement of the second belt loop 63.

With reference to FIG. 26 and FIGS. 31 and 32 the belt loops 63 both drive a shaft 50 which may drive a gearbox 28 to change the orientation of the output shafts which in turn drives a generator 06 by a suitable driving means which may be a belt or chain for example.

Figure 27:
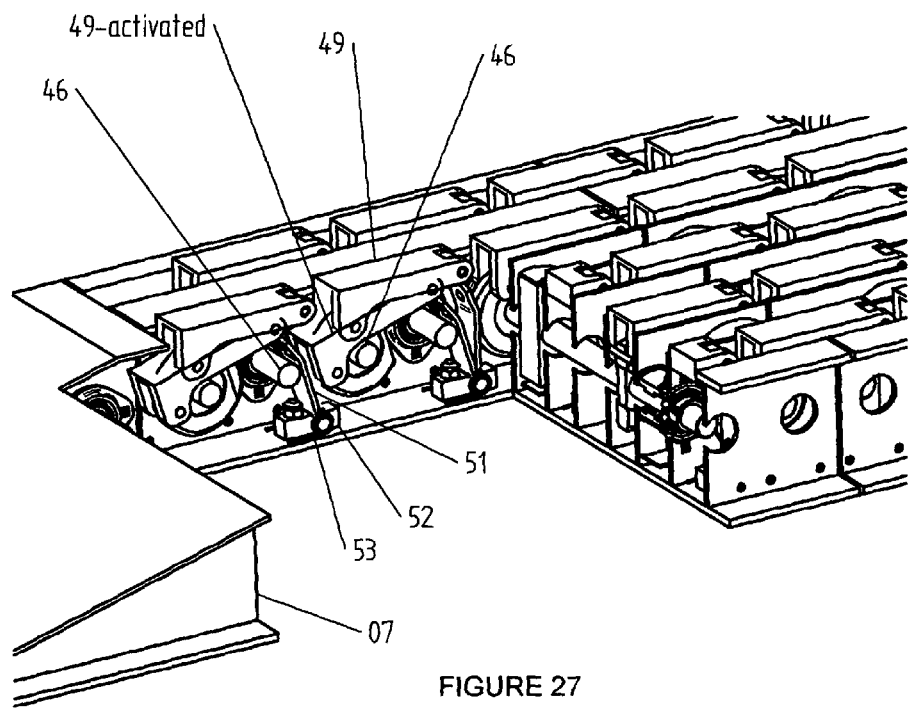
FIG. 27 shows an enlarged view of a section of the apparatus as shown in FIG. 26 with a section cut way to show the active elements relationship to each other.

FIG. 27 shows an enlarged isometric view with a section cut away for clarity. The typical active elements 49 are shown in their normal non-activated position whilst 49-activated shows the activated position. A suitable link 51 pivots about a suitable pin 54 from a mounting position 52 fixed to the housing 07 and connects at its opposite end to the active element 49 via a suitable pivot and is allowed to rotate in the direction of arrow 61 generally away from a normal non activated position. The link 51 is biased to return to its normal non activated position by a suitable spring means 53. The active elements 49 connect to elements 56 by a suitable means 58 to allow rotation. The elements 56 are mounted to the shafts 46 at a suitable spacing along the axis of the shafts and the element 56 houses a means 57 which may be a suitable one directional type of bearing, such as to allow transmission of force to cause rotation of the shafts 46 in the direction of arrow 59 when activated by the elements 49 in the direction of arrow 60, but to slip in the opposite direction. The shafts 46 are displaced in the direction of arrow 59 when the active elements 49 are activated in the direction of arrow 60 causing the belt systems to be displaced and cause rotation of the generator 06, but the active elements 49 may each return to their non-activated positions without transmission of force to the shafts 46 in the opposite direction and independently of the shafts 46 and belt loops 63.

With reference to FIG. 29 a typical vehicle wheel travelling in the direction of arrow 04 will operate only two rows of elements 49. It may be seen that active element 49a operates first, then active element 49b, 49c, 49d, 49e etc. in succession, which transmits drive power to one belt loop 63 and then the other alternatively, such that the total displacement of both of the belt loops 63 is equal to the travel distance of the vehicle from the first active element 49a to the last one operated. The shafts 46 may rotate within the element 56 and means 57 connected to all active elements 49 which are not directly beneath the vehicles wheels to cause activation and displace the belt loops 63 independently of the active elements 49 which are not activated. A suitable means such as to cause transmission of force in one direction and slippage in the opposite may be include in the pulleys 47 of the belt loop 63 system such that only the shafts 46 under the vehicles wheel and behind said wheel at the instance of activation of the elements 49 may rotate.

Figure 37:
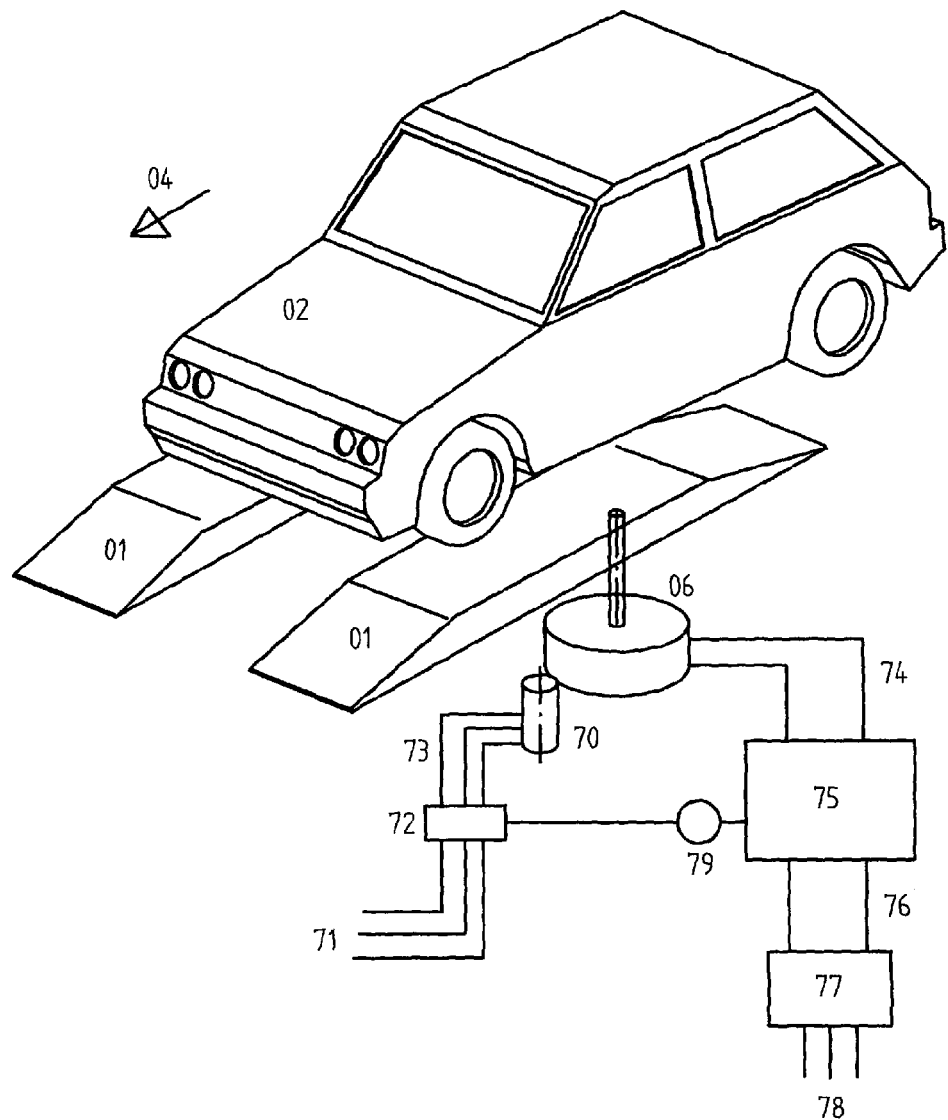
FIG. 37 shows a schematic view of how electrical energy is generated, stored and distributed.

FIG. 37 shows how the functionality of the apparatus 01 may be integrated with a suitable electrical circuit to store and utilise the energy.

The vehicle 02 travels over the apparatus 01 in the direction of arrow 04 to cause rotation of the generator 06. Cables 74 from the generator 06 connect to a suitable electrical storage means, such as a battery 75. Cables 76 from the storage means or battery connect to suitable conversion means 77 to transform the energy into the required state and the required usable electrical output is from cables 78.

A battery charge level sensor means 79 is connected to a suitable switch means 72 which controls the existing electrical mains supply through the cables 71.

The output cables 73 from the switch 72 gives electrical power when required to an electrical motor 70 which drives the generator 06 by a suitable means, which incorporates a one directional drive means to maintain the generator 06 at a constant speed when driving but can free wheel if not driving, in a similar manner to a bicycle when the pedals are powered, motion occurs but if the rider stops pedalling then the pedals slip and free wheel.

If the generator 06 is being activated by a vehicle, the storage means or battery 75 is being charged, but there may be long periods where vehicles do not operate the apparatus but the electrical energy will be constantly used from the storage means or battery, from the cables 78 and so the said storage means or battery 75 will be depleted of energy. To counteract this, the sensor means 79 detects the charge level and if this does not meet the set point, then the switch 72 will allow the mains electricity to drive the motor 70.

This arrangement ensures that in a worst case scenario where the apparatus may be rendered in a non-functional state, then the mains electricity will still drive the generator 06 to achieve the designated electrical energy output. In a similar way it may be expressed that any activation of the apparatus 01 by the vehicles 02 within a time period and the energy generated by this activation may be subtracted from the supply demand of the mains electricity at cables 78 where the difference or top up amount is supplied from the mains supply through the cables 71.

The invention claimed is:

1. An apparatus for road vehicles comprising:
   a length of closed loop of chain or belt spanning between driving sprockets or pulleys at each end;
   an active element which is biased to a non-activated position by a biasing element, the active element being configured to be deflectable from the non-activated position to an activated position by vehicle wheels;
   wherein the active element is connected to an engaging element configured to engage with the chain or belt when the active element is deflected from the non-activated position to the activated position to apply a force directly to the chain or belt such that the chain or belt is moved in the same direction as the engaging element;

wherein the engaging element is configured to, whilst the active element is in the activated position, disengage from the chain or belt in response to the chain or belt being driven in the driving direction.

2. The apparatus of claim 1, wherein the engaging element comprises a profiled cam which is connected to the active element via a pivot with a one directional clutch type bearing such that the relative position of the cam profile to the active element is configured:
- to be locked with respect to the active element to allow the engaging element to engage with the chain or belt when the active element travels in a first direction of activation; and
- to rotate freely with respect to the active element in a second opposite direction to allow the engaging element to be disengaged from the chain or belt whilst the active element is in the activated position.

3. The apparatus of claim 1, wherein the apparatus comprises a plurality of chains or belts configured such that each chain or belt is able to operate independently from each other such that displacement of any one of the chains or belts causes transmission of force to a shaft whilst all other chains or belts remain static.

4. The apparatus of claim 1, wherein the chain or belt is configured to drive an output shaft via a one directional clutch.

5. The apparatus of claim 4, wherein the apparatus comprises a gearbox configured to change the orientation of the output shaft.

6. The apparatus of claim 1, wherein the apparatus is sealed in a flexible water tight cover.

7. The apparatus of claim 1, comprising a plurality of active elements, the active elements offset or staggered a distance in a direction of travel of a vehicle in order to be activated by a vehicle's wheels in succession.

8. The apparatus of claim 1, wherein the apparatus comprises a generator configured to be driven by the chain or belt.

9. The apparatus of claim 1, wherein the active element comprises a biasing element configured to return the active element from the activated position to the non-activated position without causing displacement of the chain or belt.

10. The apparatus of claim 1, wherein the belt is a toothed belt having tooth profiles configured to be engaged by the engaging element.

11. An apparatus for road vehicles comprising:
- a length of closed loop of chain or belt spanning between driving sprockets or pulleys at each end;
- an active element which is biased to a non-activated position by a biasing element, the active element being configured to be deflectable from this non-activated position to an activated position by vehicle wheels;

wherein the active element comprises:
- an engaging element configured to engage with the chain or belt when the active element is deflected from the non-activated position to the activated position to apply a force directly to the chain or belt, and
- a disengaging element configured to allow the engaging element to be disengaged from the belt whilst an active element is in the activated position, in response to the belt being driven in the driving direction.

* * * * *